(12) United States Patent
Gan et al.

(10) Patent No.: US 7,620,833 B2
(45) Date of Patent: Nov. 17, 2009

(54) POWER SAVING FOR ISOCHRONOUS DATA STREAMS IN A COMPUTER SYSTEM

(75) Inventors: Chai Huat Gan, Penang (MY); Darren Abramson, Folsom, CA (US); Zohar Bogin, Folsom, CA (US)

(73) Assignee: Intel Corporation, Santa Clara, CA (US)

( * ) Notice: Subject to any disclaimer, the term of this patent is extended or adjusted under 35 U.S.C. 154(b) by 553 days.

(21) Appl. No.: 11/633,183

(22) Filed: Dec. 4, 2006

(65) Prior Publication Data
US 2008/0133952 A1    Jun. 5, 2008

(51) Int. Cl.
G06F 1/32 (2006.01)
(52) U.S. Cl. .................. 713/324; 713/320; 713/323
(58) Field of Classification Search .......... 713/320, 713/323, 324
See application file for complete search history.

(56) References Cited

U.S. PATENT DOCUMENTS

| | | | | |
|---|---|---|---|---|
| 5,778,218 A | * | 7/1998 | Gulick | 713/503 |
| 5,983,278 A | * | 11/1999 | Chong et al. | 709/235 |
| 6,542,564 B2 | * | 4/2003 | Cho | 375/372 |
| 6,625,743 B1 | * | 9/2003 | Gulick | 713/400 |
| 6,647,502 B1 | * | 11/2003 | Ohmori | 713/322 |
| 6,807,235 B2 | * | 10/2004 | Yano et al. | 375/259 |
| 7,398,414 B2 | * | 7/2008 | Sherburne, Jr. | 713/600 |
| 2006/0120462 A1 | * | 6/2006 | Tsuboi | 375/240.25 |
| 2006/0159093 A1 | * | 7/2006 | Joo et al. | 370/390 |

* cited by examiner

Primary Examiner—Chun Cao
(74) Attorney, Agent, or Firm—Seth Z. Kalson

(57) ABSTRACT

For isochronous data steams processed by a computer system, for example high definition audio streams, embodiments keep track of the free space available in the input and output buffers for the data streams. The available free space in the buffers determines whether various low power entry and exit thresholds are met or not. If all low power entry thresholds are met, then various circuits such as clocks, phase locked loops, and direct media interface links, may be put into a low power state, and the data stream controller enters an idle window so that memory requests are not serviced. During this time, system DRAM may begin refresh. Once the low power state has been entered into, if any exit threshold is met, then the low power state is ended. Other embodiments are described and claimed.

20 Claims, 4 Drawing Sheets

POWER SAVING FOR ISOCHRONOUS DATA STREAMS IN A COMPUTER SYSTEM

FIELD

The present invention relates to computer systems, and more particularly, to computer systems for processing data streams associated with an input/output device, such as for example processing audio data streams.

BACKGROUND

Computer systems are expected to provide various entertainment features, such as high definition audio. High definition audio streams in a computer system are considered isochronous streams. By isochronous, it is meant that memory requests related to an input audio stream, or an output audio stream, should be serviced by the computer system within a specified latency time in order to provide a pleasing experience to the user. For example, if a request for an audio frame of data from memory is made, it should be serviced within some specified latency time period, for otherwise, there may be undesirable pauses in the output audio. Similarly, if an input audio stream originating from an microphone input is to be stored in the system memory of a computer system, then the frames of the input audio stream should be stored in system memory within some specified latency time period, for otherwise the input buffer may get overloaded and drop frames.

With the isochronous requirement to guarantee time-sensitive audio data delivery, the implementation of audio processing in prior art computer systems has been such that when the high definition audio stream is active, the DMI (Direct Media Interface) link between the audio controller and the memory controller is prohibited from entering into the so-called low power L1-state, and system memory DRAM (Dynamic Random Access Memory) does not enter into its C3-Self Refresh mode so as to be available for low latency accesses. But when the high definition audio stream is active, it would save power and be of utility if the DMI link could enter into the low power L1-state, and if system memory DRAM could enter into its C3-Self Refresh mode, without violating the isochronous requirement of the high definition audio stream.

DESCRIPTION OF EMBODIMENTS in the descriptions that follow, the scope of the term "some embodiments" is not to be so limited as to mean more than one embodiment, but rather, the scope may include one embodiment, more than one embodiment, or perhaps all embodiments.

Figure 1:
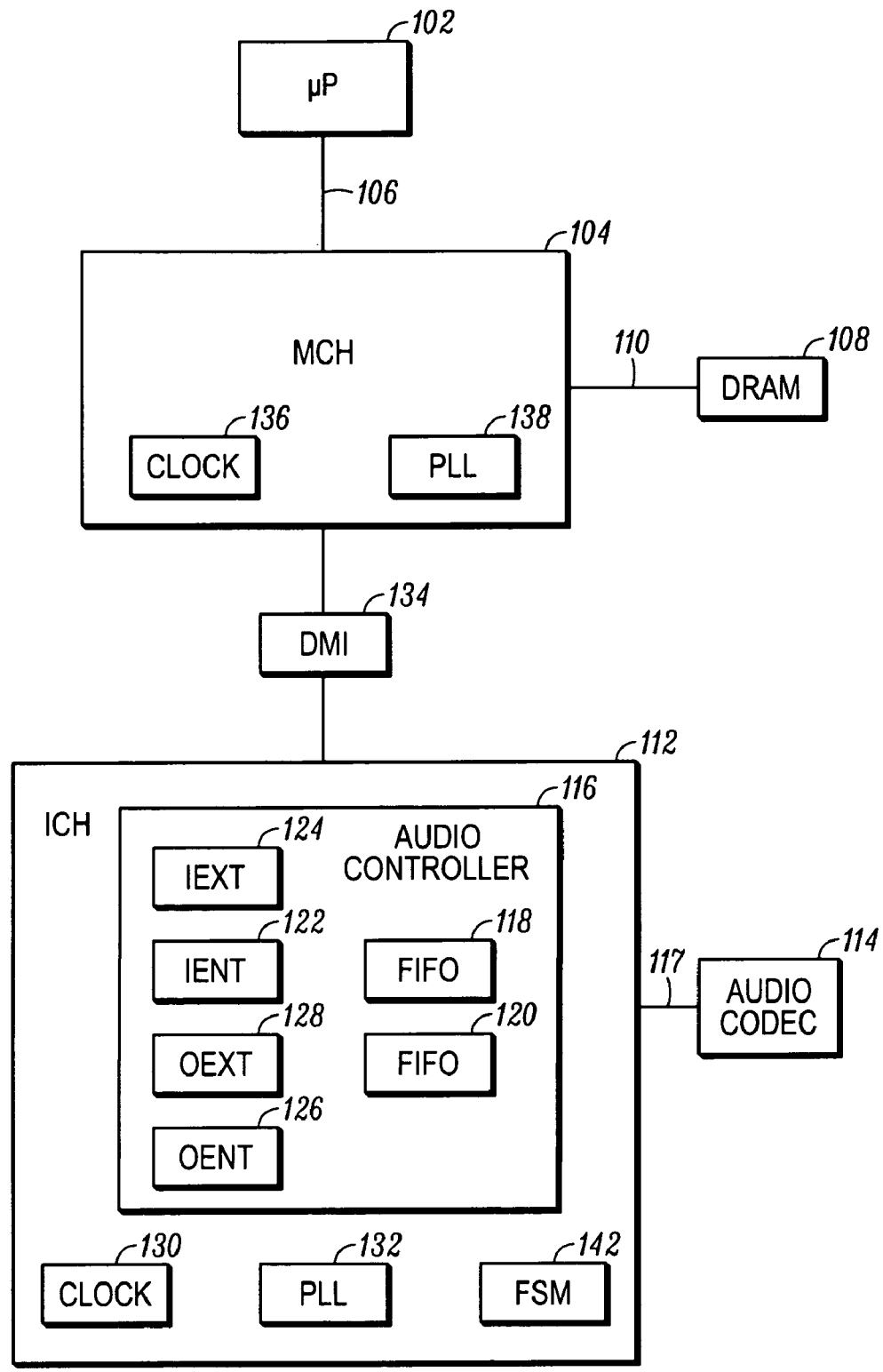
FIG. 1 illustrates a computer system according to an embodiment of the present invention.

FIG. 1 illustrates a portion of a computer system according to an embodiment of the present invention. Microprocessor 102 communicates to MCH (Memory Controller Hub) 104 by way of bus (or interconnect) 106. A function of MCH 104 is to manage communication with system memory 108 by way of bus (or interconnect) 110. MCH 104 also serves as a bridge to ICH (Input/Output Controller Hub) 112.

ICH 112 manages communication with various input/output devices, such as for example audio codec 114. The combination of MCH 104 and ICH 112 is often referred to as a chipset. However, the functions of MCH 104 and ICH 112 may be integrated on a single die, or perhaps multiple chips (dice). Some or all of the functions of MCH 104 and ICH 112 may be integrated on microprocessor 102.

System memory 108 may be DRAM (Dynamic Random Access Memory), for example. However, portions of system memory 108 may be other types of memory technology, such as SRAM (Static Random Access Memory). Furthermore, portions of system memory 108 may be integrated on microprocessor 102. System memory 108 may reside on one or more discrete chips, and may be structured as a hierarchy of memory.

Audio codec 114 may be coupled to a microphone (not shown) to provide an audio input stream, or to a speaker (not shown) for outputting an audio output stream, or both, and provides encoding of audio input streams and decoding of audio output streams. Audio streams are isochronous streams that require bounded service latency in order to provide the user a pleasing experience. Audio streams may be partitioned into frames, where each frame represents audio for a specified period of time.

ICH 112 includes audio controller 116 to provide control of and communication to audio codec 114 by way of audio bus 117. Audio controller 116 includes buffers for buffering input and output data streams. As an example, a buffer may be structured as an FIFO (First-In-First-Out) queue, where input buffer 118 is an FIFO for input audio data streams, and output buffer 120 is an FIFO for output audio data streams.

Associated with input buffer 118 are two thresholds, an input-stream-low-power-entry threshold, and an input-stream-low-power-exit threshold. These thresholds, denoted as IENT and IEXT, respectively, in FIG. 1, are respectively stored in registers 122 and 124. Associated with output buffer 120 are two thresholds, an output-stream-low-power-entry threshold, and an output-stream-low-power-exit threshold. These thresholds, denoted as OENT and OEXT, respectively, in FIG. 1, are respectively stored in registers 126 and 128. These thresholds may be programmed by BIOS (Basic Input Output System) software stored and operating in microprocessor 102. The use of these thresholds allow entry into a low power state, and exit from the low power state, while allowing audio codec 114 to continue providing an input data stream to audio controller 116 over audio bus 117, or to receive an output data stream from audio controller 116 over audio bus 117, while still maintaining the isochronous requirement of the audio streams.

The input-stream-low-power-entry threshold is said to be satisfied (or met) when the amount of free space, in units of audio frames, in input buffer 118 is equal to or greater than the input-stream-low-power-entry threshold. The output-stream-low-power-entry threshold is said to be satisfied when the amount of free space, in units of audio frames, in output buffer 120 is equal to or less than the output-stream-low-power-entry threshold. When both of these entry thresholds are satisfied, the low power state is entered into. In the low power state, audio controller 116 enters an idle window in which system memory (DRAM) requests are not initiated, and yet audio streaming over audio bus 117 may still continue. As a result, when the low power state is entered into, system memory may enter into its C3-Self Refresh mode. Furthermore, various circuits in ICH 112 and MCH 104 may be put into a sleep mode to save power. For example, various functional units, such as clock 130 and PLL (Phase Locked Loop) 132 in ICH 112 may be shut down or put into a power saving mode. Also, DMI 134 may be put into a L1-state to save power. Similarly, in MCH 104, clock 136, and PLL 138 may be put into their respective low power states.

The input-stream-low-power-exit threshold is said to be satisfied when the amount of free space, in units of audio frames, in input buffer 118 is equal to or less than the input-stream-low-power-exit threshold. The output-stream-low-power-exit threshold is said to be satisfied when the amount of free space, in units of audio frames, in output buffer 120 is equal to or greater than the output-stream-low-power-exit threshold. Once the system is in its low power state, if either one of these exit thresholds are satisfied, then the low power state is exited.

The output-stream-low-power-exit threshold is greater than or equal to the output-stream-low-power-entry threshold, and the input-stream-low-power-entry threshold is greater than or equal to the input-stream-low-power-exit threshold. Hysteresis may be introduced into the system if the output-stream-low-power-exit threshold is strictly greater than the output-stream-low-power-entry threshold, and if the input-stream-low-power-entry threshold is strictly greater than the input-stream-low-power-exit threshold.

Figure 2:
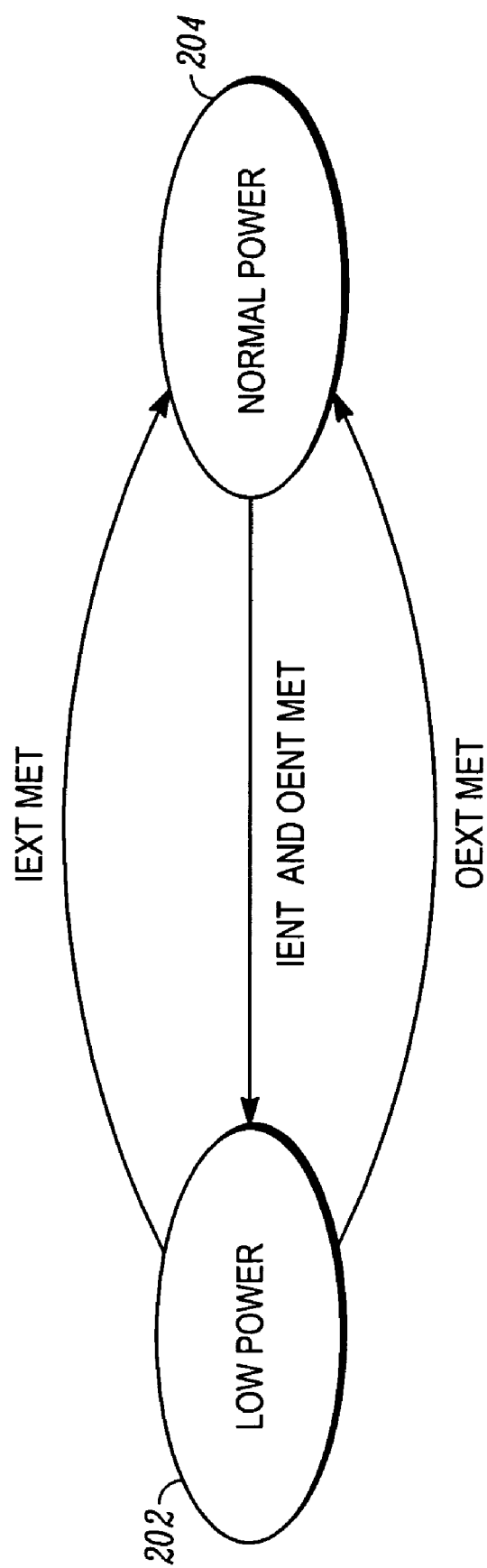
FIG. 2 illustrates a state diagram according to an embodiment of the present invention.

An embodiment may be viewed as having two states. This is illustrated in FIG. 2, with low power state 202 and normal power state 204. Low power state 202 is entered into only when both the input-stream-low-power-entry and the output-stream-low-power-entry thresholds are met. Normal power state 204 is entered into when either the input-stream-low-power-exit threshold or the output-stream-low-power-exit threshold is met. The finite state machine illustrated in FIG. 2 may be implemented by FSM (Finite State Machine) 142 functional unit in ICH 112.

In the embodiment of FIG. 1, it is assumed that there are two buffers, one buffer for input streams, and a second buffer for output streams. Accordingly, there are two exit thresholds and two entry thresholds; a first set of entry and exit thresholds for one of the buffers, and a second set of entry and exit thresholds for the other buffer. In other embodiments, there may be a set of buffers for a set of input streams, and a set of buffers for a set of output streams. For some embodiments, there may be multiple audio channels. For example, for high definition audio, it is expected that some embodiments of ICH 112 may provide support for four input streams and four output streams. Consequently, the embodiment illustrated in FIG. 1 may be easily generalized to the case in which there is a set of entry and exit thresholds for a set of input buffers, and for which there is a set of entry and exit thresholds for a set of output buffers. This results in an expanded state diagram.

Figure 3:
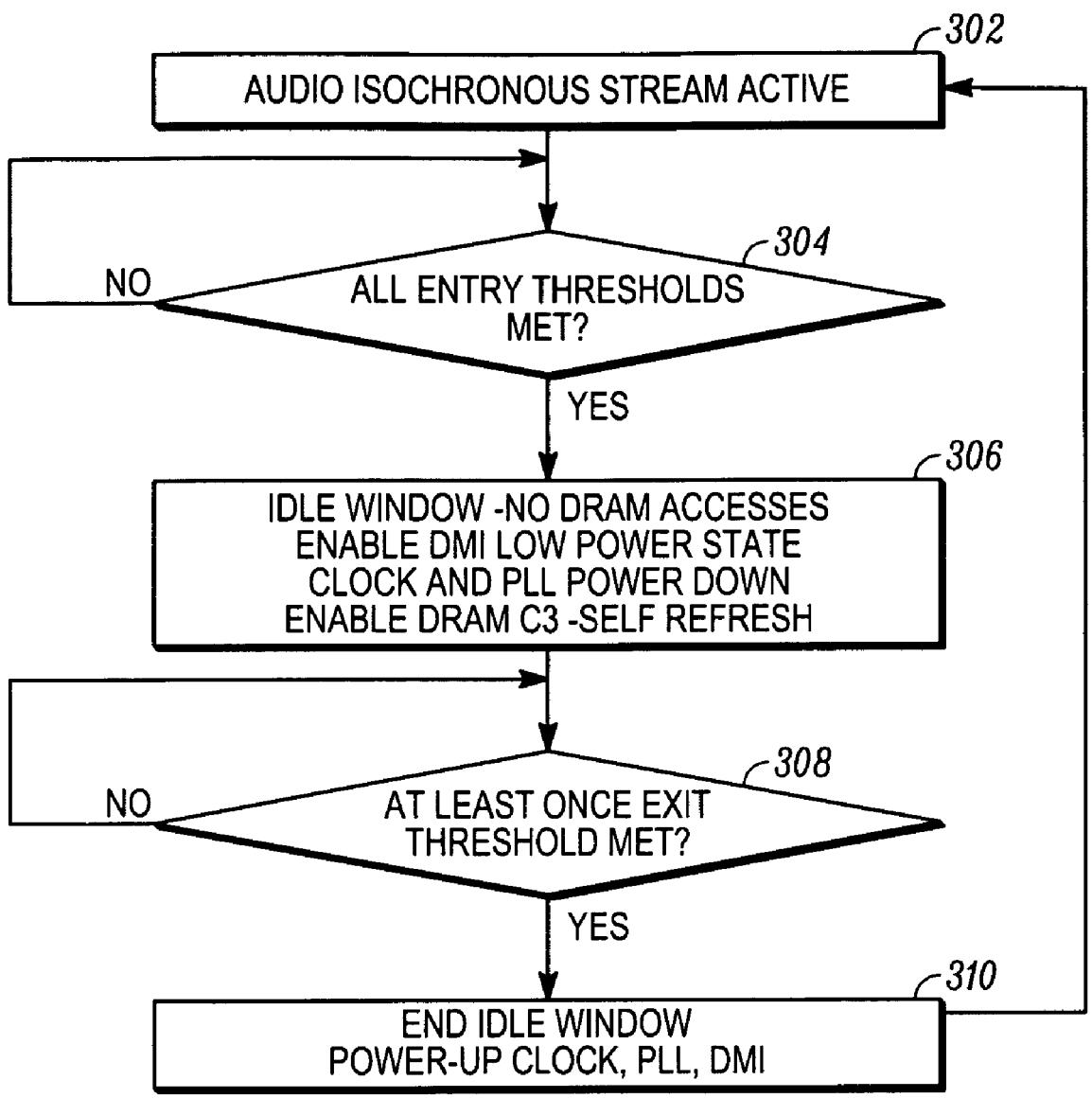
FIG. 3 illustrates a flow diagram according to an embodiment of the present invention.

Operations of some embodiments may also be described with respect to the flow diagram illustrated in FIG. 3, which conveniently illustrates the above-described case in which there may be a set of entry and exit thresholds corresponding to a set of input streams, and a set of entry and exit thresholds corresponding to a set of output streams. In block 302, the audio streams are active, and the entry thresholds are monitored in block 304. When all entry thresholds are met, control is brought from block 304 to block 306. Block 306 puts the system into a low power state. More particularly, for the embodiments represented by FIG. 3, an idle window is entered into whereby no memory requests from audio controller 116 to system memory are initiated. In the particular embodiment of FIG. 3, system memory comprises DRAM. Also, the low power state of DMI 134 is enabled, and various clocks and phase locked loops, when applicable, are shutdown, or put into a low power state.

In block 308, all exit thresholds are monitored. When any exit threshold is met, control is brought to block 310, where the idle window is exited so that memory requests may proceed, the DMI link is powered up, any clocks or phase locked loops that were shut down are now powered up, and DRAM is exited from C3-Self Refresh back into normal operation.

In this way, it is expected that embodiments will achieve a savings in power consumption when compared to prior art systems in which there are no idle windows. To help take advantage of such power savings when there are idle windows, some embodiments may also utilize an enhanced arbitration policy for servicing memory requests related to the audio buffers when the idle windows are exited.

In practice, there are multiple memory requests per time frame of audio data. For example, as described above, an embodiment ICH 112 servicing high definition audio may service four input streams and four output streams. Each stream has its dedicated DMA (Direct Memory Access) engine to make read requests for an output stream, or to make write requests for an input stream. In addition to these memory requests, the descriptor structure for each DMA is stored in system memory. When a direct memory access begins, the DMA engine will first cause a memory read request to fetch the desired descriptor structure from system memory. For some embodiments for high definition audio, a descriptor structure may be a circular buffer in system memory, where each entry defines the starting address of an allocated block in system memory, and defines the size of the block. For a single frame of high definition audio in which an embodiment ICH 112 supports four input streams and four output streams, there may be up to four direct memory accesses per stream, each one initiating a memory request to fetch the descriptor structure, as well as memory requests to retrieve audio data for output streams, or memory requests to store audio data for input streams.

During an idle window, there may be a number of memory requests that have entered into a request queue. Once an idle window is exited, it is useful to provide a mechanism to handle these queued memory requests. For some embodiments, an arbitration policy for handling such memory requests utilizes frames and superframes, where a frame in the arbitration policy corresponds to an audio frame time, and a superframe refers to a sliding window (in time) comprising a plurality of such frames.

There are two running counts associated with memory requests for a buffer: a frame grant count and a superframe grant count. The frame grant count keeps track of the number of memory requests serviced within a frame time, up to some maximum. This maximum may be referred to as the maximum frame grant count. The superframe grant count keeps track of the sum of memory requests granted within a superframe time, that is, a sliding window of multiple frames, up to some maximum. This maximum may be referred to as the maximum superframe grant count.

Initially, the frame grant count and the superframe grant count are each set to zero. When a memory request associated with an audio frame is first serviced, the frame grant count is incremented by one, and the superframe grant count is incremented by one. As each memory request for that audio frame is serviced, the frame grant count is incremented by one, as long as it is less than a maximum frame grant count; and the superframe grant count is incremented by one, as long as it is less than the maximum superframe grant count. When a frame grant count or a superframe grant count equals its respective maximum, it is no longer incremented. If both the frame grant count and the superframe grant count are equal to their respective maximums, then no more service requests are provided for the audio buffer until other higher priority queues are serviced. When these other queues have been serviced and the memory requests for the audio buffer are to be serviced again, the frame grant count is re-set to zero.

While memory requests are being serviced for an audio buffer, if a new audio frame time begins, then the frame grant count is re-set to zero; and the superframe grant count is re-calculated because the oldest audio frame is no longer in the sliding window when a new audio frame enters the sliding window. By employing both a superframe grant count and a frame grant count, where the superframe grant count keeps track of memory requests over a sliding window of frame times, then a burst of memory requests may be serviced. That is, it is expected that the use of superframes allows the hardware to properly service audio memory requests for the case in which a relatively large number of memory requests should be serviced on a transient basis.

The maximum frame grant count and the maximum superframe grant count may be programmed by BIOS, and loaded in registers in audio controller 116. The running values for the frame grant count and the superframe grant count may be stored in registers in audio controller 116.

Figure 4:
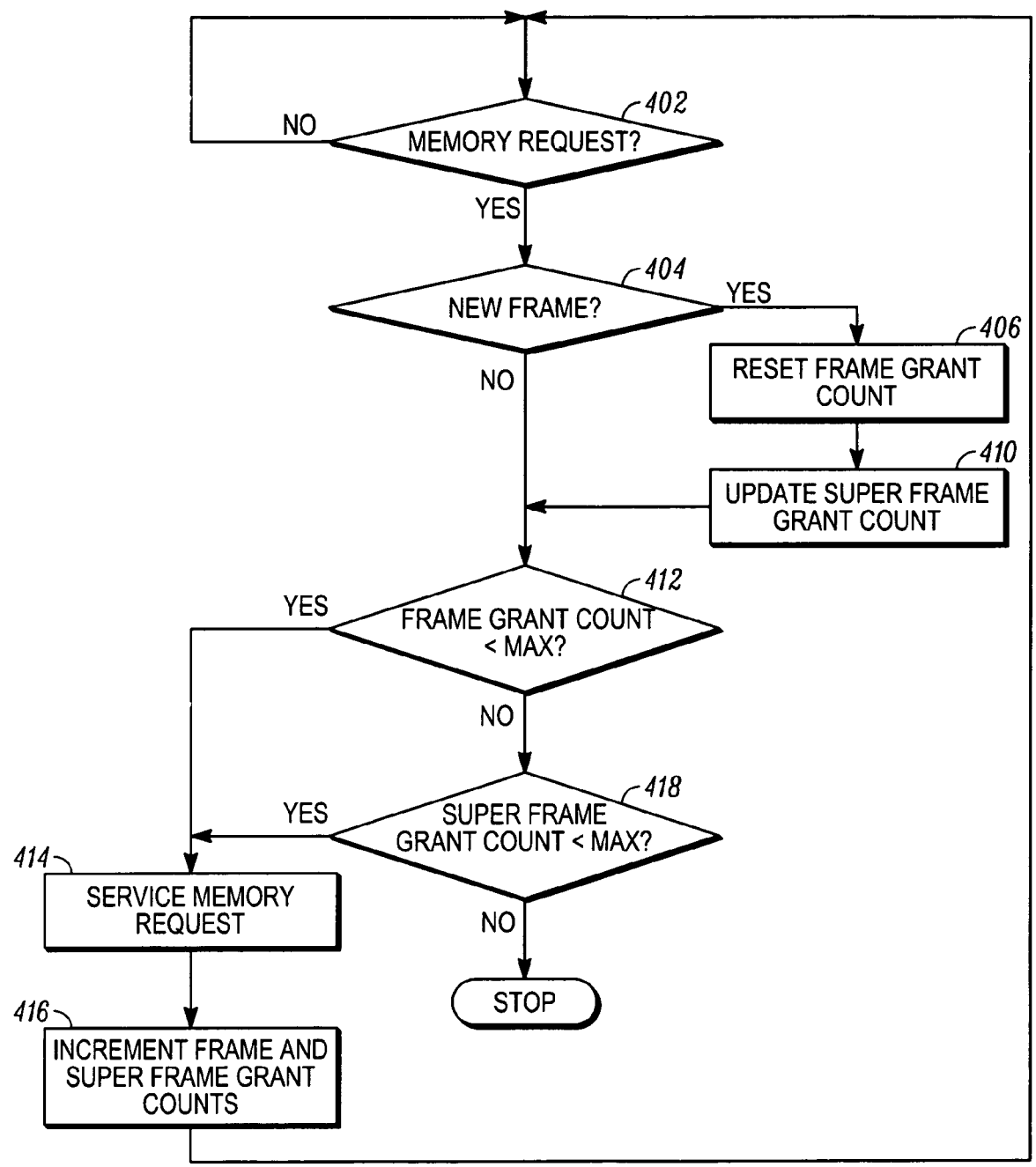
FIG. 4 illustrates a flow diagram according to another embodiment of the present invention.

The above enhanced arbitration policy may be described with respect to the flow diagram of FIG. 4. Assuming that the frame and superframe grant counts have been initialized and memory requests for an audio buffer are to be serviced, if a memory request is encountered in block 402, then control is brought to block 404. If in block 404 it is determined that the memory request is for a new audio frame time, then in block 406 the frame grant count is reset to zero, the superframe grant count is updated in block 410, and control is brought to block 412; otherwise, control is brought directly to block 412.

In block 412, if it is determined that the frame grant count is less than the maximum frame grant count, then control is brought to block 414 so that the memory request may be serviced. Then, control is brought to block 416, where the frame grant count and the superframe count are each incremented by one. However, if in block 412 it is determined that the frame grant count is equal to the maximum frame grant count, then control is brought to block 418, where it is determined whether the superframe grant count is less than the maximum superframe grant count. If it is, then control is brought to block 414, but if the superframe grant count is equal to the maximum superframe grant count, then the memory request is not serviced, and some other request queue is serviced.

Various modifications may be made to the disclosed embodiments without departing from the scope of the invention as claimed below. For example, the data streams were described as audio data streams. However, the scope of the claims are not necessarily limited to data streams associated with audio, and may apply to other types of data streams, such as video, for example.

What is claimed is:

1. An apparatus comprising:
    a data stream controller comprising a set of input buffers to store frames of a set of input data streams, and a set of output buffers to store frames of a set of output data streams, where corresponding to each input buffer is an input entry threshold and an input exit threshold, and corresponding to each output buffer is an output entry threshold and an output exit threshold; and
    a memory controller to service memory requests provided by the data stream controller only if either at least one of the set of input buffers has free space less than or equal to an input exit threshold, or at least one of the set of output buffers has free space greater than or equal to an output exit threshold.

2. The apparatus as set forth in claim 1, the apparatus having an idle window in which the data stream controller does not initiate memory requests if each input buffer has free space greater than or equal to an input entry threshold, and if each output buffer has free space less than or equal to an output entry threshold.

3. The apparatus as set forth in claim 2, wherein the output exit threshold is greater than the output entry threshold, and the input entry threshold is greater than the input exit threshold.

4. The apparatus as set forth in claim 2, further comprising a data link interface between the data stream controller and the memory controller, wherein the apparatus puts the data link interface into a low power state if each input buffer has free space greater than or equal to the input entry threshold, and if each output buffer has free space less than or equal to the output entry threshold.

5. The apparatus as set forth in claim 4, wherein the output exit threshold is greater than the output entry threshold, and the input entry threshold is greater than the input exit threshold.

6. The apparatus as set forth in claim 2, further comprising a clock, wherein the apparatus powers down the clock if each input buffer has free space greater than or equal to the input entry threshold, and if each output buffer has free space less than or equal to the output entry threshold.

7. The apparatus as set forth in claim 6, further comprising a data link interface between the data stream controller and the memory controller, wherein the apparatus puts the data link interface into a low power state if each input buffer has free space greater than or equal to the input entry threshold, and if each output buffer has free space less than or equal to the output entry threshold.

8. The apparatus as set forth in claim 7, wherein the output exit threshold is greater than the output entry threshold, and the input entry threshold is greater than the input exit threshold.

9. The apparatus as set forth in claim 8, wherein the input data stream comprises input audio data, and the output data stream comprises output audio data.

10. An apparatus comprising:
    a data stream controller comprising a set of input buffers to store frames of a set of input data streams, and a set of output buffers to store frames of a set of output data streams, where corresponding to each input buffer is an input entry threshold and an input exit threshold, and corresponding to each output buffer is an output entry threshold and an output exit threshold; and
    wherein the data stream controller does not initiate memory requests if each input buffer has free space greater than or equal to an input entry threshold, and if each output buffer has free space less than or equal to an output entry threshold.

11. The apparatus as set forth in claim 10, further comprising:
    a memory controller; and
    a data link interface between the data stream controller and the memory controller, wherein the apparatus puts the data link interface into a low power state if each input buffer has free space greater than or equal to the input entry threshold, and if each output buffer has free space less than or equal to the output entry threshold.

12. The apparatus as set forth in claim 10, further comprising a clock, wherein the apparatus powers down the clock if each input buffer has free space greater than or equal to the input entry threshold, and if each output buffer has free space less than or equal to the output entry threshold.

13. The apparatus as set forth in claim 12, further comprising a data link interface between the data stream controller and the memory controller, wherein the apparatus puts the data link interface into a low power state if each input buffer has free space greater than or equal to the input entry threshold, and if each output buffer has free space less than or equal to the output entry threshold.

14. The apparatus as set forth in claim 10, wherein the input data stream comprises input audio data, and the output data stream comprises output audio data.

15. A system comprising:

a microprocessor;

memory;

a memory controller coupled to the microprocessor and the memory, the memory controller to service memory requests to the memory; and a data stream controller comprising a set of input buffers to store frames of a set of input data streams, and a set of output buffers to store frames of a set of output data streams, where corresponding to each input buffer is an input entry threshold and an input exit threshold, and corresponding to each output buffer is an output entry threshold and an output exit threshold;

wherein the memory controller services memory requests provided by the data stream controller only if either at least one of the set of input buffers has free space less than or equal to an input exit threshold, or at least one of the set of output buffers has free space greater than or equal to an output exit threshold.

16. The computer system as set forth in claim 15, the data stream controller having an idle window in which the data stream controller does not initiate memory requests if each input buffer has free space greater than or equal to an input entry threshold, and if each output buffer has free space less than or equal to an output entry threshold.

17. The computer system as set forth in claim 16, wherein the output exit threshold is greater than the output entry threshold, and the input entry threshold is greater than the input exit threshold.

18. The computer system as set forth in claim 16, further comprising a data link interface between the data stream controller and the memory controller, wherein the computer system puts the data link interface into a low power state if each input buffer has free space greater than or equal to the input entry threshold, and if each output buffer has free space less than or equal to the output entry threshold.

19. The computer system as set forth in claim 16, further comprising a clock, wherein the computer system powers down the clock if each input buffer has free space greater than or equal to the input entry threshold, and if each output buffer has free space less than or equal to the output entry threshold.

20. The computer system as set forth in claim 19, wherein the input data stream comprises input audio data, and the output data stream comprises output audio data.

* * * * *